(12) United States Patent
Ashman et al.

(10) Patent No.: US 12,326,323 B2
(45) Date of Patent: Jun. 10, 2025

(54) ANTI-BACKLASH APPARATUS AND AN ACTUATOR WITH ANTI-BACKLASH TRANSMISSION

(71) Applicant: BAE Systems Controls Inc., Endicott, NY (US)

(72) Inventors: Damon S. Ashman, Binghamton, NY (US); Dan A. Snavely, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 18/261,912

(22) PCT Filed: Jan. 22, 2021

(86) PCT No.: PCT/US2021/014576
§ 371 (c)(1),
(2) Date: Jul. 18, 2023

(87) PCT Pub. No.: WO2022/159095
PCT Pub. Date: Jul. 28, 2022

(65) Prior Publication Data
US 2024/0077291 A1    Mar. 7, 2024

(51) Int. Cl.
*F42B 10/64* (2006.01)
*F16H 21/28* (2006.01)
*F16H 55/18* (2006.01)

(52) U.S. Cl.
CPC ............. *F42B 10/64* (2013.01); *F16H 21/28* (2013.01); *F16H 55/18* (2013.01)

(58) Field of Classification Search
CPC .......... F42B 10/64; F42B 10/62; F42B 19/01; F42B 19/06; F16H 21/28; F16H 55/18
See application file for complete search history.

(56) References Cited

U.S. PATENT DOCUMENTS

| 5,635,809 | A | * | 6/1997 | Ganser ................ F24F 13/1426 318/560 |
| 6,247,666 | B1 | * | 6/2001 | Baker ................... B63H 11/117 244/3.29 |
| 2007/0007383 | A1 | | 1/2007 | Hsu et al. |
| 2012/0211594 | A1 | * | 8/2012 | Corradini ................ F42B 10/64 244/3.21 |
| 2012/0216636 | A1 | | 8/2012 | Sokolofsky |

(Continued)

FOREIGN PATENT DOCUMENTS

| CA | 2075103 A1 | 2/1994 |
| WO | 2020112194 A2 | 6/2020 |

OTHER PUBLICATIONS

International Search Report, PCT/US21/14576, mailed Apr. 13, 2021, 8 pages.

*Primary Examiner* — Rodney A Bonnette
(74) *Attorney, Agent, or Firm* — Scott J. Asmus; Scully Scott Murphy & Presser PC

(57) ABSTRACT

Apparatuses and techniques for reducing backlash between components in a transmission system are provided. The apparatuses and techniques provide a controllable torque over a target range of motion of a component in the transmission system. This eliminates the play at the interfaces between components and forces the components to maintain a controlled contact between the interfacing surfaces.

16 Claims, 20 Drawing Sheets

(56) References Cited

U.S. PATENT DOCUMENTS

| | | | |
|---|---|---|---|
| 2013/0057037 A1* | 3/2013 | Horiki | A47C 1/03266 |
| | | | 297/301.1 |
| 2016/0102584 A1 | 4/2016 | Evans et al. | |
| 2021/0231406 A1* | 7/2021 | Zemany | F41G 7/346 |
| 2021/0231424 A1* | 7/2021 | Zemany | F42B 10/14 |
| 2021/0239430 A1* | 8/2021 | Zemany | F42B 10/64 |

* cited by examiner

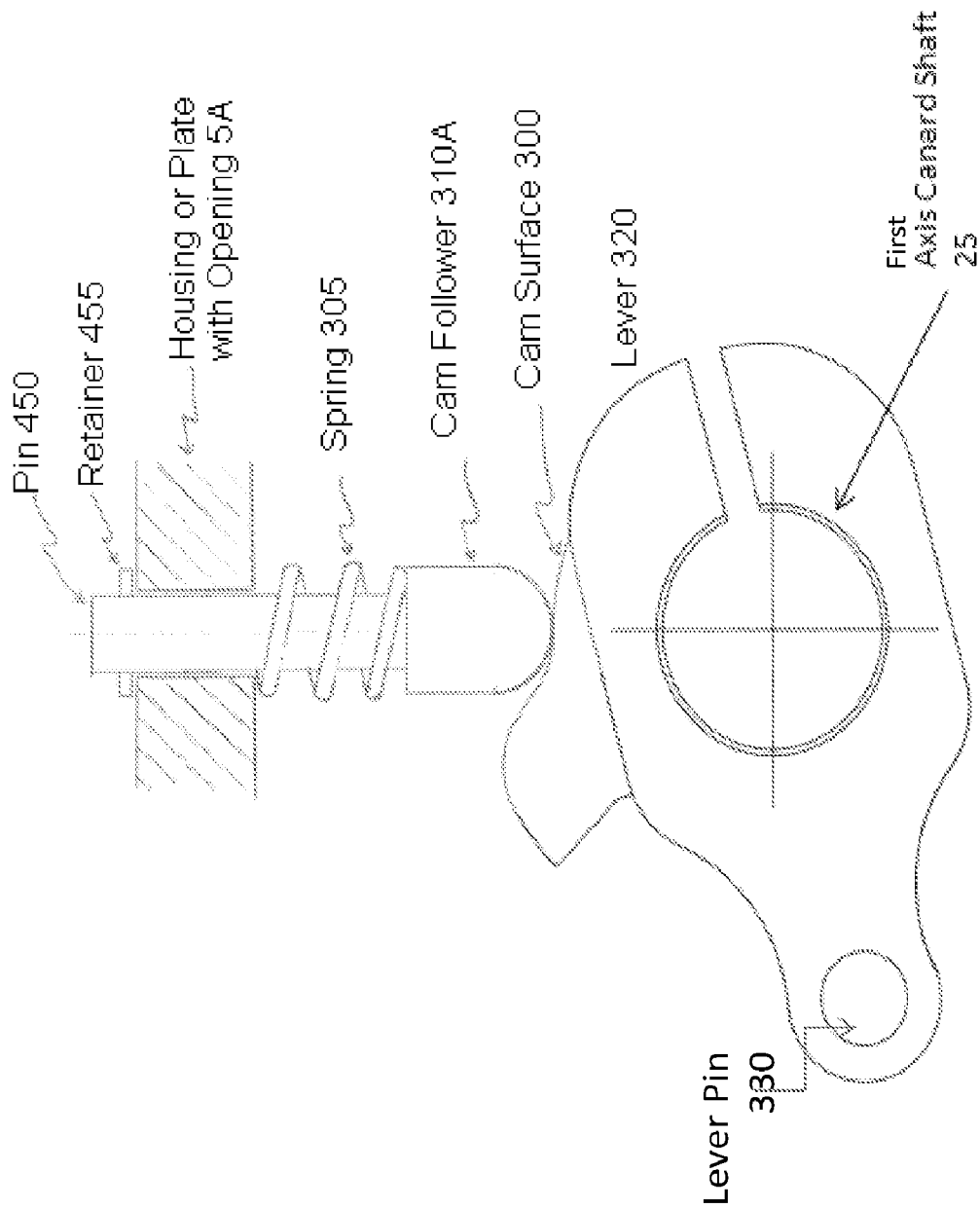

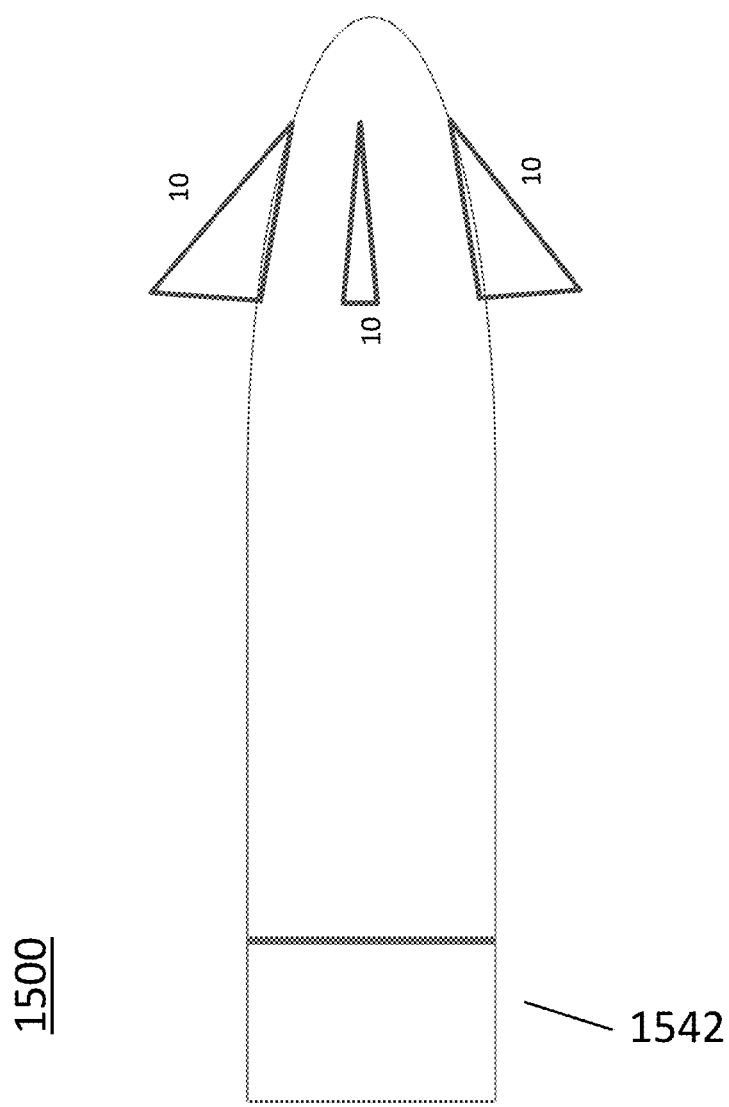

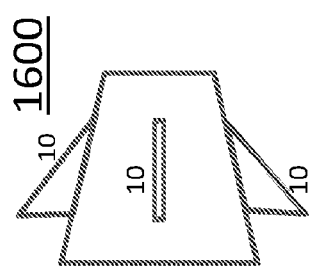
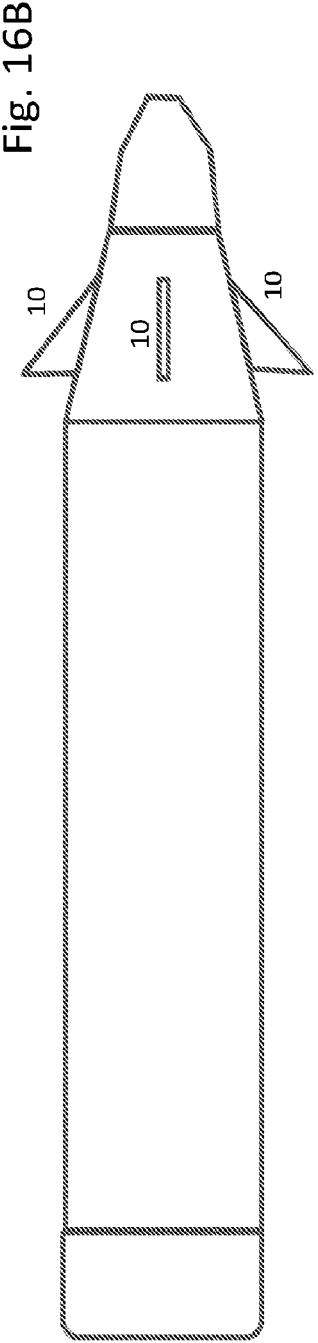

ANTI-BACKLASH APPARATUS AND AN ACTUATOR WITH ANTI-BACKLASH TRANSMISSION

FIELD OF THE DISCLOSURE

This disclosure relates to transmission systems with multiple components and reducing a backlash between the components. This disclosure also relates to an actuator having a mechanism which reduces the backlash.

BACKGROUND

An actuator is a component that moves and controls the motion of a target. The actuator has a source of energy, such as a motor. The motor may drive a plurality of components in a power transmission path to move and control the motion of the target. The motor may be bi-directional. When the motor switches directions, e.g., forward and reverse, backlash may occur at interfaces between components. Backlash results from components clearances and tolerances. For example, a source of backlash may be a clearance between male and female threading, such as between a drive screw and a rotating nut. Other sources of backlash may be a result of other types of interfaces. For example, backlash may result from the relationship between a pin (round) and a corresponding opening (round) such as in a cross pin and connecting rod or a lever pin and the connecting rod in an actuator, e.g., clearance at the interface due to nominal size differences and tolerances. Another source of backlash may be the interface between the pin and a slot in a guide, such as in a center guide of an actuator.

Backlash causes problems with the control of a motion and/or position of the target.

SUMMARY

Accordingly, disclosed are mechanisms for reducing a backlash in a transmission system. The transmission system may be in an actuator.

For example, the apparatus may comprise a drive source, a transmission path, an output shaft and a load. The transmission path is connected to the drive source. The transmission path comprises a plurality of components. The output shaft is connected to the transmission path.

In an aspect of the disclosure, the output shaft may have an extended section. One end of the load is anchored and another end of the load is in contact with the extended section. This provides a controllable torque over a target range of angles of the output shaft.

In other aspects of the disclosure, at least one of the components of the transmission path may have the extended section. One end of the load is anchored and another end of the load is in contact with the extended section. This provides a controllable torque over a target range of an angle of the at least one component.

In some aspects, the extended section may comprise a cam. The load may comprise a cam follower and a spring. One end of the spring is anchored and the other end is connected to the cam follower. The cam follower contacts the cam surface and exerts a force on the cam surface. This causes a controllable torque when the at least one of the plurality of components or the output shaft rotates and the cam follower contacts different portions of the cam surface.

In other aspects, the extended section may comprise a gear segment. The load may comprise a spring, a pinion gear lever and a pinion gear. One end of the spring is anchored and the pinion gear lever is rotatably connected to other end of the spring. The pinion gear is connected to the pinion gear lever, where the pinion gear meshes with the gear segment and exerts a force on the gear segment, causing the controllable torque as the at least one of the plurality of components or the output shaft rotates and the pinion gear contacts different portions of the gear segment.

In other aspects, the anti-backlash mechanism may be included in an actuator. The actuator may be part of a kit. The kit may be for a precision-guided munition.

In other aspects, a munition may comprise an actuator having anti-backlash mechanism as described herein.

BRIEF DESCRIPTION OF THE DRAWINGS

FIG. 4C is another example of a cam follower in accordance with aspects of the disclosure;

FIG. 15 show an example of a precision-guided munition having an actuator in accordance with aspects of the disclosure;

FIG. 16A shows an example of a kit for a precision-guided munition in accordance with aspects of the disclosure and FIG. 16B shows an example of a precision-guided munition having the kit attached in accordance with aspects of the disclosure.

DETAILED DESCRIPTION

Figure 1:
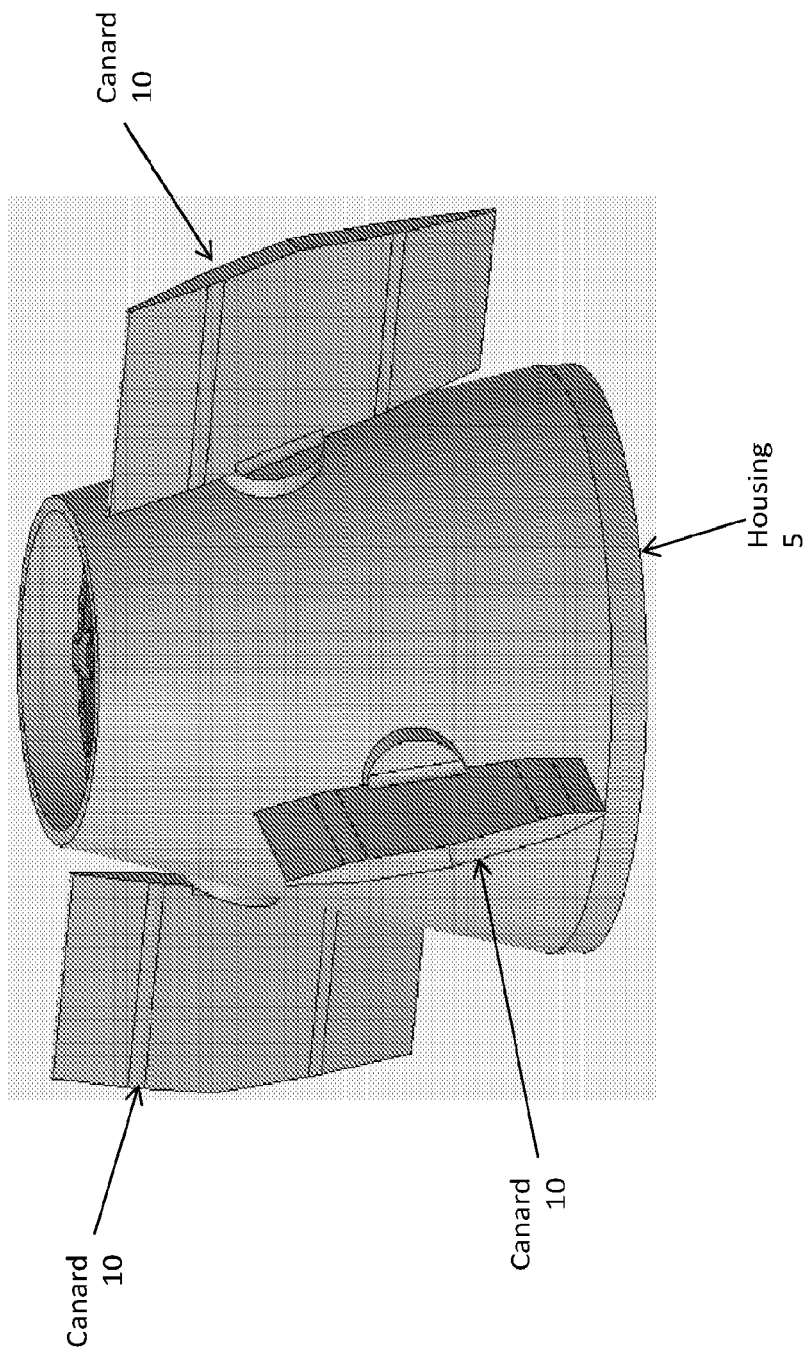
FIG. 1 is an actuator with the canards installed.
Figure 2:
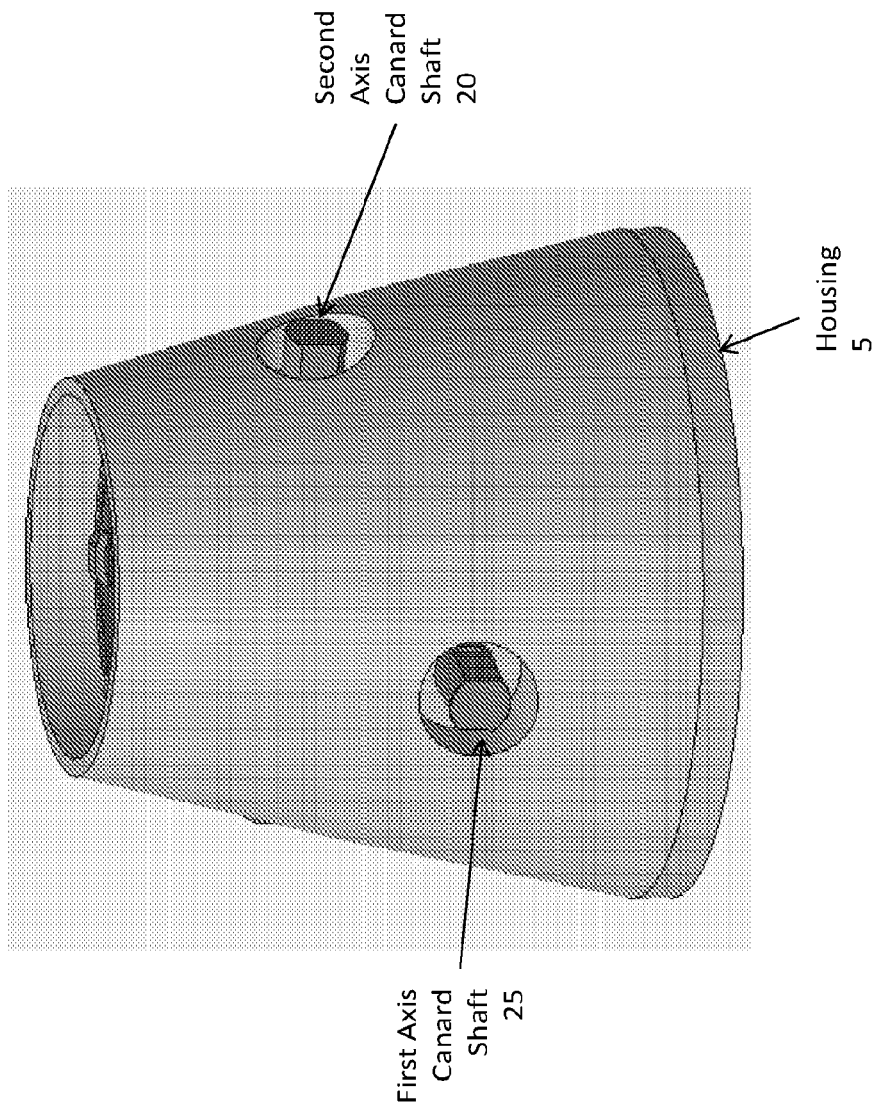
FIG. 2 is an actuator without the canards installed to show the canard shafts.

FIGS. 1 and 2 depict an external view of an example of an actuator 1. The actuator 1 depicted may be used for precision-guided munitions. However, an actuator 1 may be used as part of other mechanical transmission systems such as for pressure valves, cars, buses, boats, . . . etc. The actuator 1 comprises a housing 5. The actuator 1 may include Canards 10. As depicted, in FIG. 1, there are multiple canards 10. In some aspects of the disclosure, the canards 10 work in pairs for a specific axis. In other aspects, the canards 10 work independently. For example, one of the canards may be for a first axis and another of the canards may be for a second axis. In an aspect of the disclosure, the first axis may be a roll axis and the second axis may be a lift axis. However, the canards 10 may be for other axes. The canards 10 are attached to the actuator 1 via respective canard shafts 20, 25. While two of the canard shafts 20, 25 are shown in FIG. 2, the actuator 1 may have a different number of shafts.

The movement and position of the canards 10 are controlled based on a respective motor and transmission path. The motor and the components of the respective paths are the same. For purposes of the description, the first axis will be described.

Figure 3:
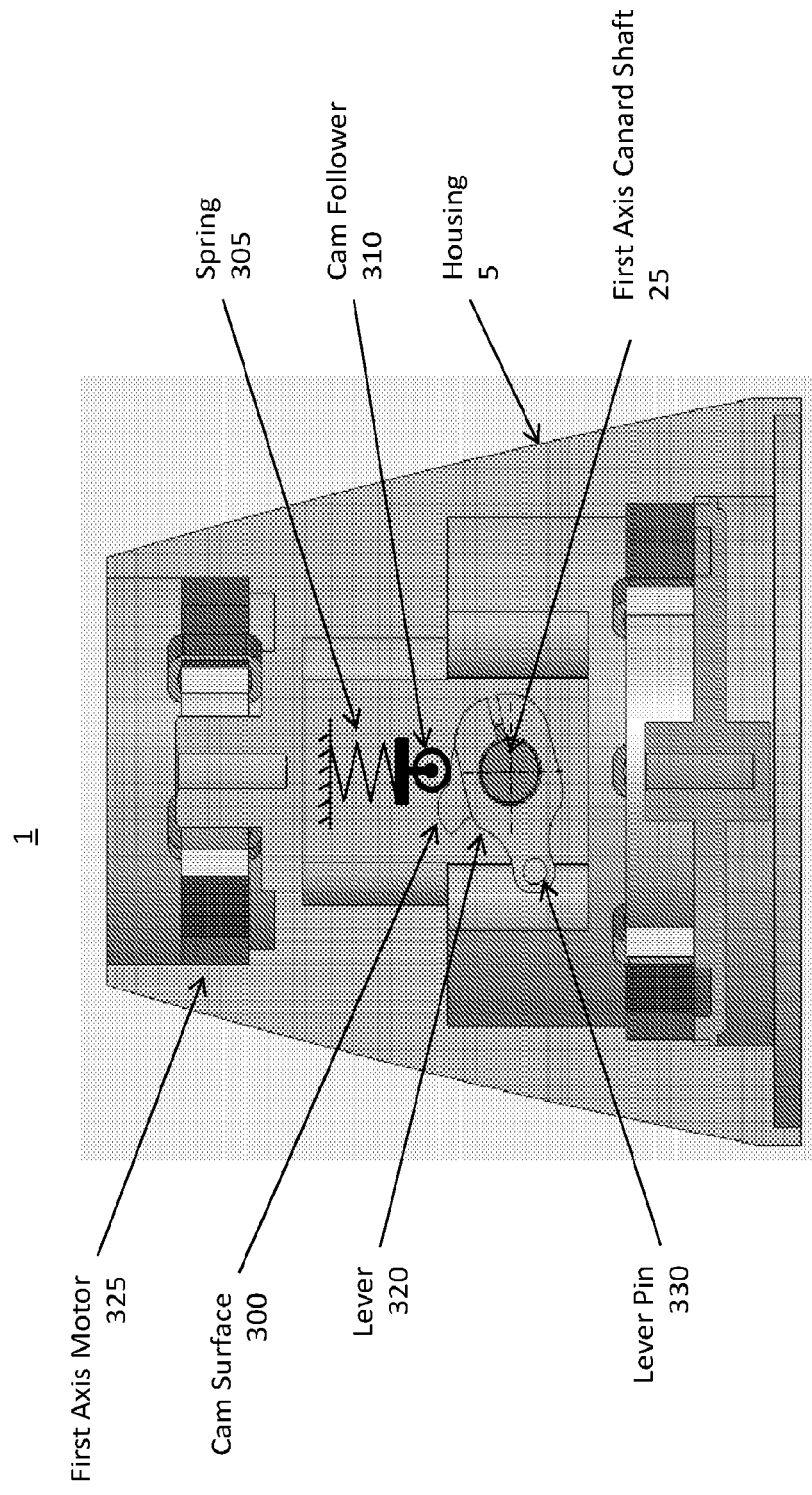
FIG. 3 is sectional view of an actuator having an anti-backlash mechanism in accordance with aspects of the disclosure.

FIG. 3 depicts an actuator 1 having an anti-backlash mechanism in accordance with aspects of the disclosure. Each motor 325 is a bi-directional motor. The motor 325 drives a plurality of components of the transmission path. For example, the motor 325 may drive a drive screw 340 (not shown in FIG. 3). The drive screw 340 may be positioned within a center guide (not shown in FIG. 3). The drive screw 340 may have male threading and the center guide may have female threading to correspond with the male threading in the drive screw 340. The drive screw 340 and the center guide may have an opening. The opening may be on the opposite end of the drive screw 340 from the threading. The opening in the center guide corresponds to the opening in the drive screw 340. The openings may be configured to receive a pin, such as a cross pin. The cross pin may be for coupling one of the components of the transmission path (not shown in FIG. 3) to the drive screw 340. The component may have a corresponding opening such that the pin may be inserted therein.

In an aspect of the disclosure, the center guide may extend longitudinally such that the guide may be used for the drive screw 340 for another axis.

A component of the transmission path may also have opening for a lever pin 330. A lever 320 may be coupled to the component using the lever pin 330. One or more components of the transmission path may be between the drive screw 340 and the lever 320. The lever 320 may also have an opening for the lever pin 330. The lever 320 may also have an opening for the first axis canard shaft 25. In an aspect of the disclosure, the canard shaft 25 may be integral with the lever 320. In other aspects, the canard shaft may be separate and inserted into the opening of the lever 320.

The angle of the lever (and thus the position of the canard shaft and canard) may be controlled by the motor 325 via the transmission path (drive screw 340, one or more connecting components and pins). The lever 320 is rotatably connected to one of the components.

The transmission path, which has a plurality of components, may be subject to backlash. In accordance with aspects of the disclosure, the actuator 1 comprises an anti-backlash mechanism. The anti-backlash mechanism enables a controllable torque to be applied over a target range of motion, e.g., angle of the component, such as the lever. The target range of motion referred to may include positive and negative angles for the component, such as the lever.

In some aspects, the lever 320 may comprise an extended section. For example, as depicted in FIG. 3, the extended section is a cam surface 300 (e.g., an example of a cam). The cam surface 300 may be formed integral with the lever 320. For example, the lever 320 with the cam surface 300 may be formed via 3-dimensional printing techniques. However, other fabricating techniques may be used. In other aspects of the disclosure, the cam surface 300 may be attached to an edge of the lever 320 after the lever 320 is formed. The size, shape and location of the cam surface 300 may be application specific and designed for a target controllable torque and a target range of motion. The length of the cam surface 300 is proportional to the target range of motion. For example, the longer the cam surface is, the larger the range of motion that may have the controllable torque. The start position of the cam surface 300 on the component determines in part a starting angle for the controllable torque and the end position of the cam surface 300 on the component determines in part the ending angle for the controllable torque.

When the target range of motion includes an angle of zero for the component, the cam surface 300 may be disposed along the free end of the component near the center of the free end.

In other aspects of the disclosure, when the target range of motion does not include an angle zero for the component, but rather other angles, such as 45°, the cam surface 300 may be disposed on a top surface of the component such as shown in FIG. 3, where the cam surface is disposed along the top surface of the lever 320.

In other aspects, the location of the cam surface 300 may depend on the type of actuator and the space available for an extended section.

Figure 4A:
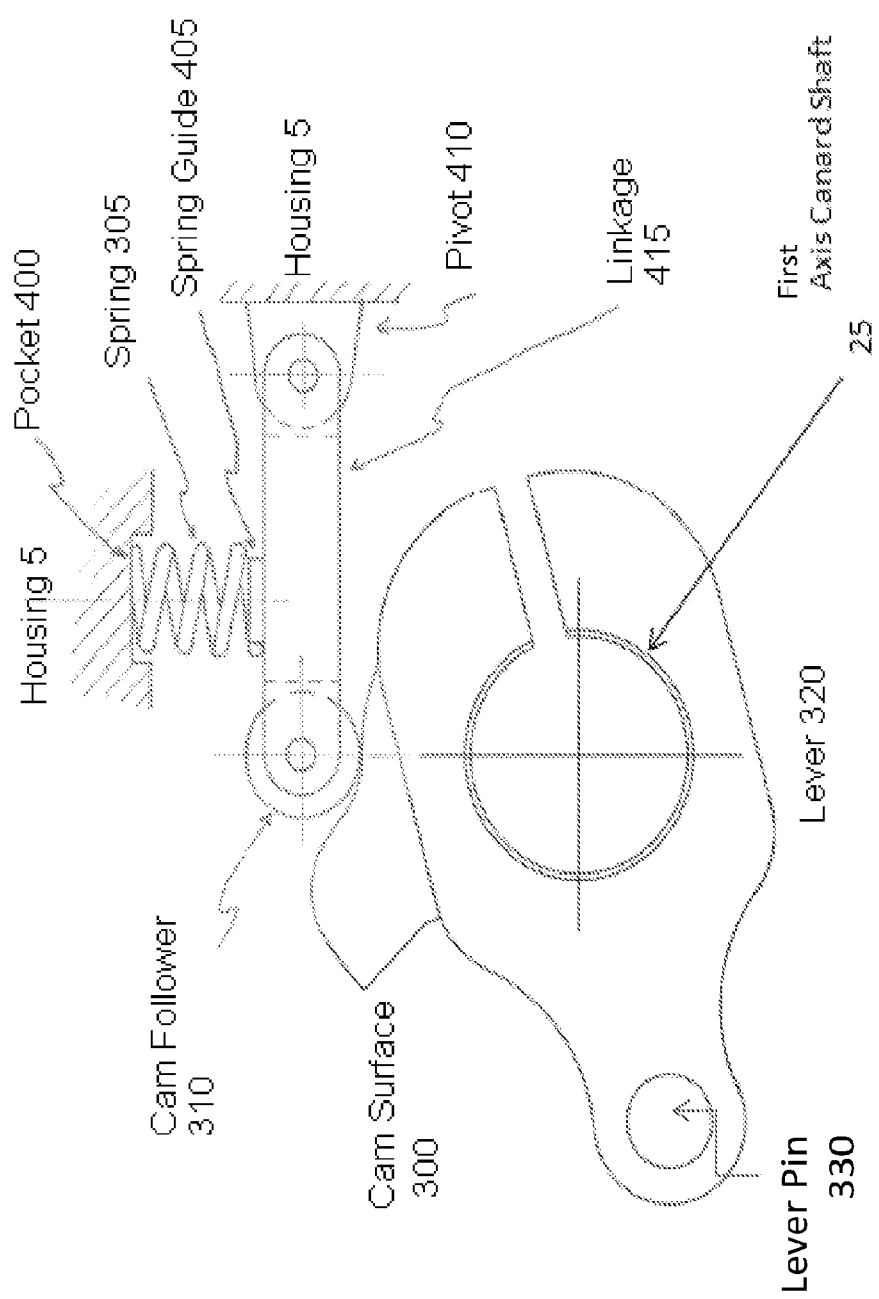
FIG. 4A is an example of a cam follower of the anti-backlash mechanism and anchoring position in accordance with aspects of the disclosure.

The anti-backlash mechanism may also comprise a spring 305 and a cam follower 310. The spring 305 may be anchored to the housing 5 of the actuator 1. FIG. 4A illustrates one example of how the spring 305 may be anchored to the housing 5. In an aspect of the disclosure, the housing may have a recess (pocket 400). One end of the spring may be attached to (mounted) within the pocket 400. In an aspect of the disclosure, the other end of the spring 305 may be directly connected to the cam follower 310 (as shown in FIG. 3). In other aspects (as shown in FIG. 4A), the spring may be connected to a linkage 415 via a spring guide 405. In this aspect of the disclosure, one end of the linkage 415 is coupled to the cam follower and the other end is anchored the housing 5 via a pivot 410. The pivot 410 is attached to the housing via a screw or epoxy. The pivot 410 may have an opening for the linkage 415 to be mounted such as via a screw. In this configuration, the free end of the linkage (with the cam follower 310) rotates.

Figure 5:
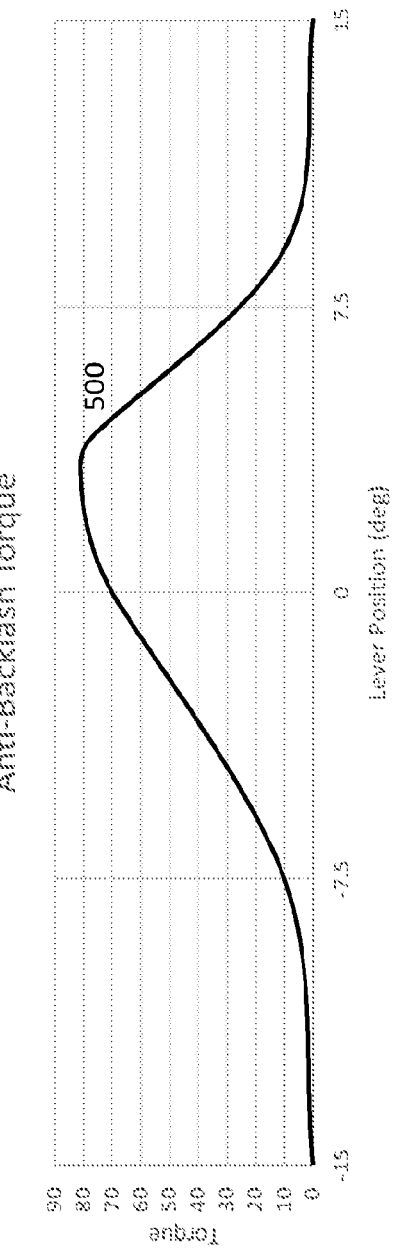
FIG. 5 is a graph showing an example of a torque and angle curve for an anti-backlash mechanism in accordance with aspects of the disclosure.
Figure 7:
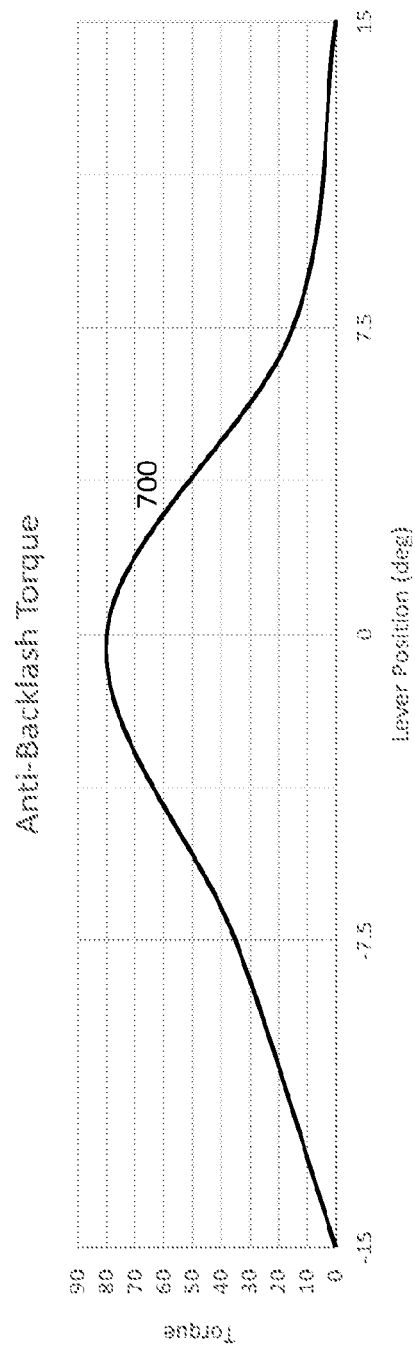
FIG. 7 is a graph showing an example of a torque and angle curve for another anti-backlash mechanism in accordance with other aspects of the disclosure.

The location of the pivot 410 and/or spring mount to the housing may be application specific. For example, the location may be based on the type of actuator and the space available. The location may also be based on the desired controllable torque and target range of motion as shown in FIGS. 5 and 7.

In an aspect of the disclosure, the spring 305 is a compression spring having a spring constant determined based on an amount of torque required for the application. In other aspects of the disclosure, depending on the relative position of the spring 305 and the cam follower 310, an extension spring may be used.

Figure 4B:
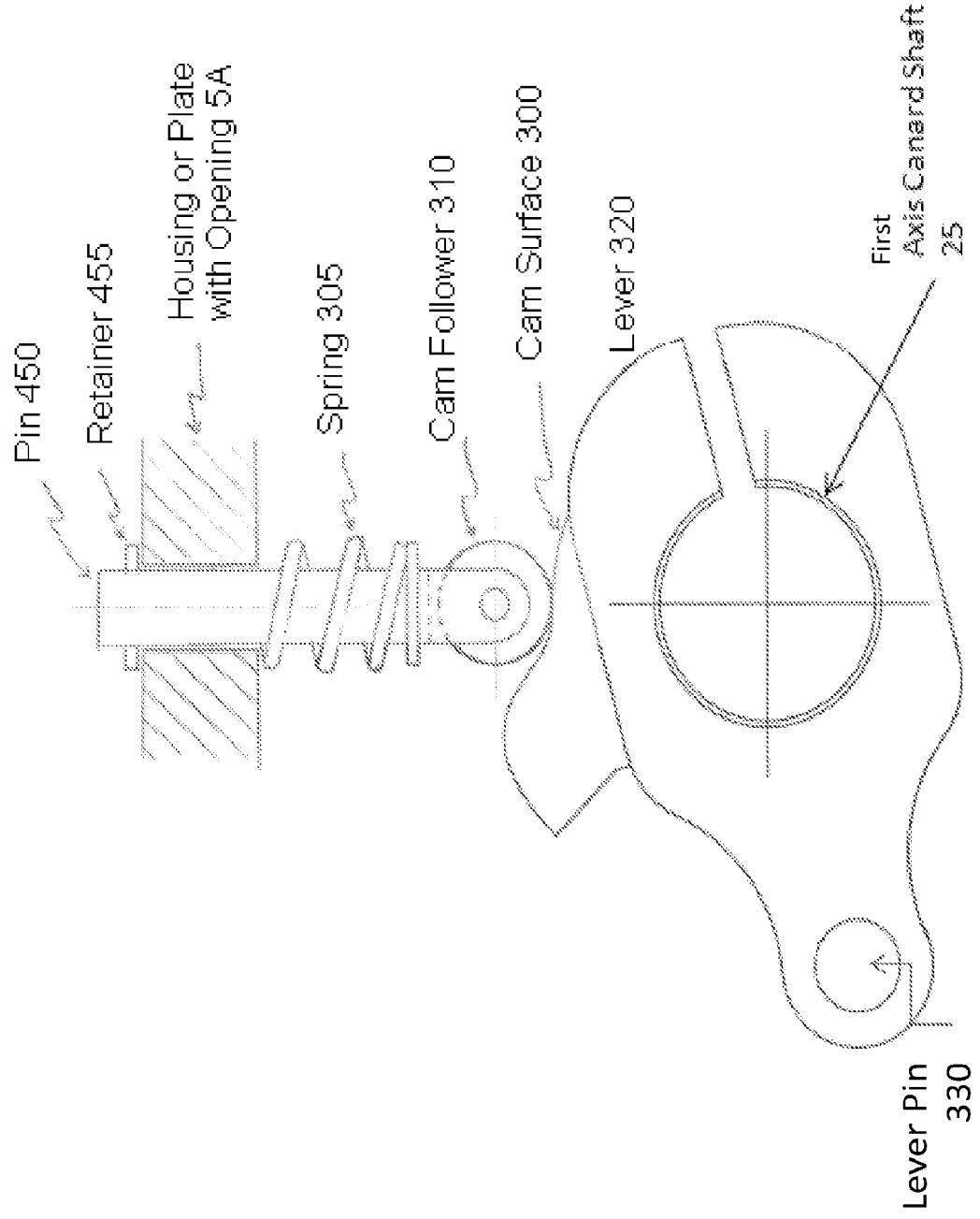
FIG. 4B is another example of cam follower of the anti-backlash mechanism and anchoring position with aspects of the disclosure.

FIG. 4B illustrates another example of anchoring a portion of the anti-backlash mechanism in accordance with aspects of the disclosure. In an aspect of the disclosure, the housing 5A has an opening such as a counterbore. A pin 450 may be inserted into the opening. In other aspects, a plate 5A may be included in the housing and the opening may be in the plate instead of the housing. The pin 450 has a retainer 455 to prevent movement of the pin 450 (anti-rotation). The retainer 455 may be wings or an extended section. The retainer 455 may be screwed into the housing 5. In other aspects, the retainer 455 may be fixed in place via epoxy. The pin 450 acts as a linkage. As shown in FIG. 4B, the spring 305 is around the pin.

The cam follower 310 may be a roller, a ball, a bearing or any other object with a curved surface. The cam follower 310 is attached to the spring 305 and/or linkage 415 or pin 450. For example, the cam follower 310 may be attached to the opposite end from the anchor point. The cam follower 310 may be attached via clevis pin or shouldered pin. However, other attachment mechanisms may be used.

FIG. 4C illustrates another example of a cam follower 310A. The anchoring is similar to shown in FIG. 4B. In FIG. 4C the cam follower 310A may be a curved surface of the pin 450. The curved surface may be made of as elastomer material. In an aspect of the disclosure, the curved surface may be a plunger made of Teflon™ (polytetrafluoroethylene) or similar low friction material that slides along the cam surface 300. The plunger may be formed separate from the pin 450 and crimped, threaded or glued onto the pin 450.

Advantageously, by using the anti-backlash mechanism, such as described herein, a controllable torque over the target range of motion eliminates the play at the interfaces between components and forces the components to maintain a controlled contact between the interfacing surfaces.

In some aspects, the linkage 415 may be used when the space is limited and available anchor points are not aligned with the component. The linkage 415 may also be used to tailor the shape of a controllable torque verse angle curve. The linkage 415 may be a rod. While FIGS. 4A-C depict the spring 305 mounted above the cam followers 310, 310A, as described above, the spring 305 may be mounted in other locations such that the spring force may have different components.

For example, the spring may be inclined. In other aspects, the force may be caused by the linkage 415 or pin 450. The directionality may also be controlled based on location. In an aspect of the disclosure, the cam surface 300 may be configured to provide controllable torque over a target range of motion from about −15° to about 150 for the angle of the component.

FIG. 5 is a graph showing an example of a torque and lever angle curve 500 for the example of the anti-backlash mechanism where the cam surface is located on the free end of the lever 320 and a linkage 415 was used. For example, the mounted location of the spring, linkage and location of the cam surface is shown in FIGS. 6A-6E. As can be seen, the controllable torque is asymmetric. The asymmetric torque may be imparted due to the linkage 415, the location of the cam surface 300 relative to the lever 320 and the location relative to the cam follower 310. As shown in FIG. 5, the controllable torque is a minimum at +−15°. In other aspects of the disclosure, the target range may be other angles, such as +−90°. In accordance with this aspect, the cam surface 300 may be extended to cover more of the lever 320. In other aspects, the controllable torque may be symmetric about 0° of lever angle. For example, changing the contact angle of the cam follower/cam, a resultant torque may be controlled that is symmetric about a position.

The controllable torque may be based on the point of contact between the cam follower 310 and lever 320 at a given angle of the lever 320 and directional components of force imparted by a linkage 415 (if used). FIGS. 6A-6E depicts the torque and direction of the torque based on the angle of the lever 320 and shows the point of contact (POC 600). FIGS. 6A-6E also depict other components of the transmission path including pin 330, connecting rod and a cross pin.

Figure 6:
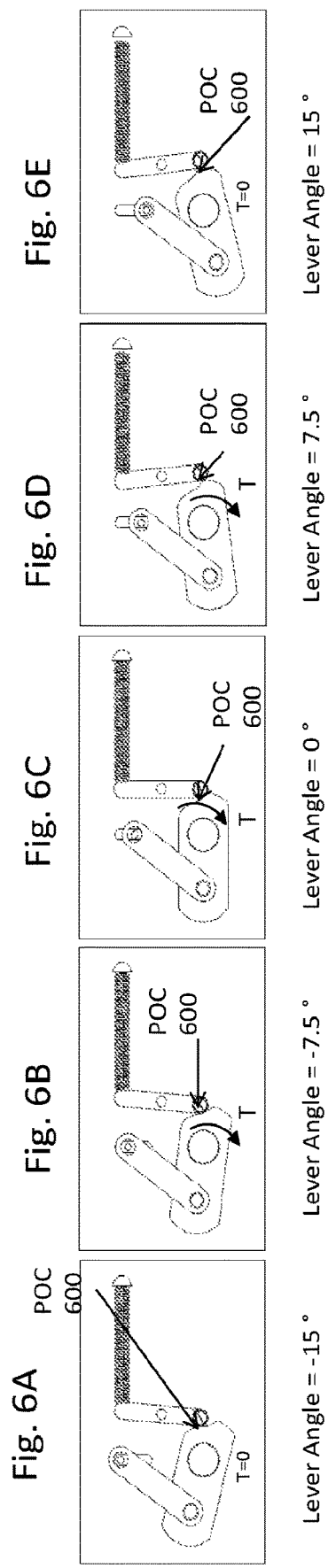
FIGS. 6A-6E show examples of a contact point of the cam follower with the cam for the actuator having an anti-backlash mechanism at different angles of the lever.

FIG. 6A depicts the POC 600 of the cam follower 310 with the lever 320 when at a lever angle of −15°. In the position depicted in FIG. 6A, the cam follower 310 has not yet reached the cam surface 300. Therefore, no torque is applied to the lever 320 by the cam follower 310 (and spring 305) via the linkage 415. In this position, the applied force is radial, and the force vector is through the center of rotation which is why there is no torque. In the position depicted in FIG. 6B, the cam follower 310 has a POC 600 on the inclined surface of the cam surface 300. The lever angle is −7.5°. The cam follower 310 applies a clockwise torque to the lever 320. In the position depicted in FIG. 6C, the cam follower 310 has a POC 600 on the inclined surface of the cam surface 300 further from the axis of rotation. The lever angle is 0°. The cam follower 310 applies larger clockwise torque to the lever 320 than in the POC 600 in FIG. 6B. As shown, the force imparted by the linkage 415 is downward, e.g., large vertical component.

In the position depicted in FIG. 6D, the cam follower 310 has a POC 600 near the apex of the cam surface 300. The lever angle is 7.5°. In this position, the linkage 415 is rotated past a vertical position, and is angled away from the lever 320. The vertical component of the force is less. Thus, the cam follower 310 applies the clockwise torque to the lever 320 less than when at POC 600 in FIG. 6C.

In the position depicted in FIG. 6E, the cam follower 310 has a POC 600 on a surface sloping toward the axis of rotation. The cam follower 310 does not apply a torques to the lever 320 due to the directionality of the force.

In the example depicted in FIGS. 4A-4C, the spring 305 is located above the lever 320. In other aspects of the disclosure, the spring 305 may be aligned with the lever 320. In other aspects, the linkage 415 may also be omitted.

FIG. 7 is a graph showing an example of a torque and angle curve 700 for an anti-backlash mechanism in accordance with aspects of the disclosure where the linkage 415 is removed and the spring 305 is aligned with the lever 320. Aligned with the lever 320 refers to when the lever is at an angle of zero, a virtual horizontal line intersects the opening for the lever pin 330 (see, e.g., FIG. 8C).

As shown in FIG. 7, the maximum torque applied is approximately at 0° of angle for the lever 320.

Figure 8:
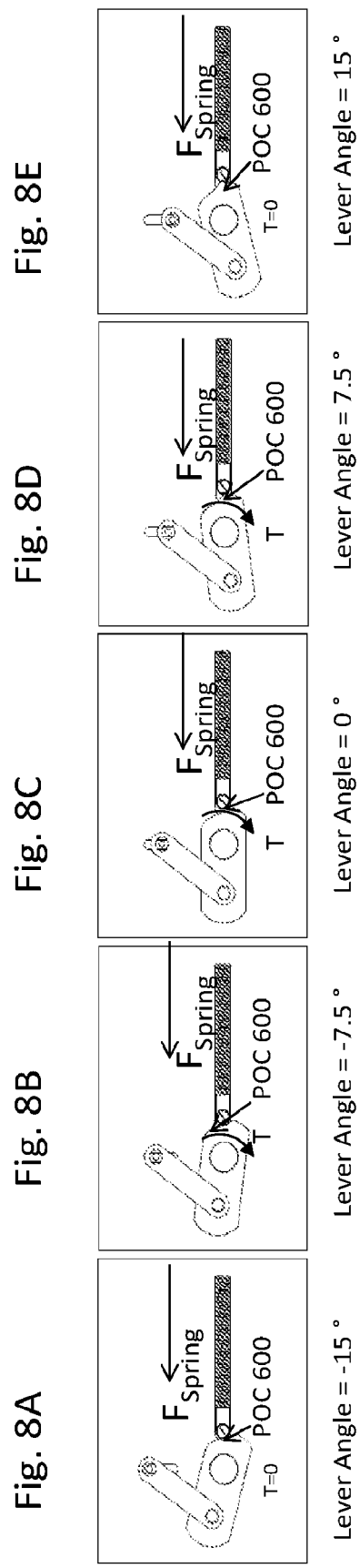
FIGS. 8A-8E show the contact point of the cam follower with the cam for the actuator having an anti-backlash mechanism in accordance with aspects of the disclosure at different angles of the lever.

FIGS. 8A-8E depict points of contact (POC 600) for different rotation angles, e.g., −15° (FIG. 8A), −7.5° (FIG. 8B), 0° (FIG. 8C), 7.5° (FIG. 8D) and 15° (FIG. 8E). While the points of contact for the angle of rotations for FIGS. 6A-6E and FIGS. 8A-8E, respectively, are the same, the torque that is produced is different because of the different anchor point of the spring and elimination of the linkage. In FIGS. 8A-8E, the spring force Fspring is applied via the cam follower 310 onto the cam surface 300 without the linkage. FIGS. 8A-8E also depict other components of the transmission path including pin 330, connecting rod and a cross pin.

Figure 9:
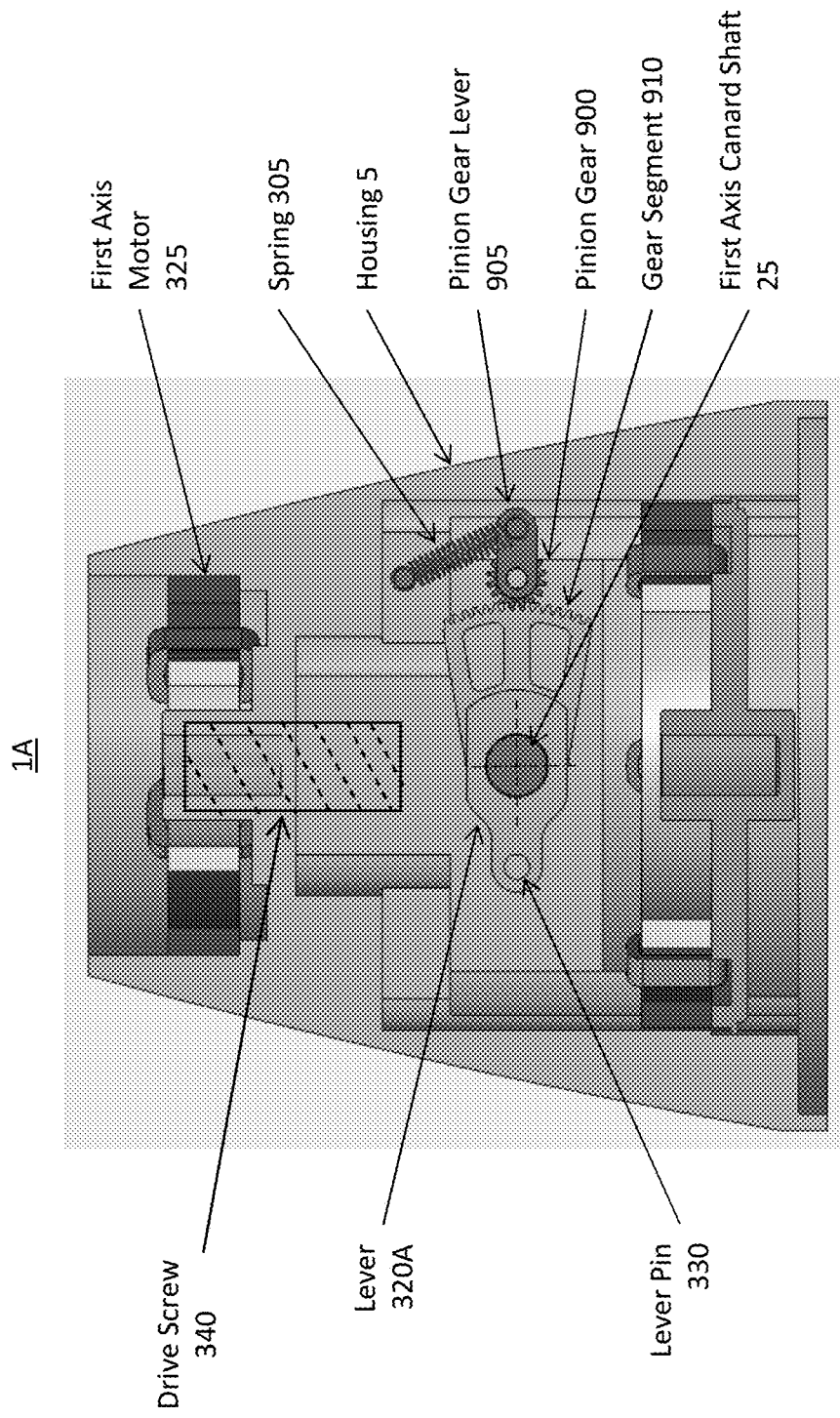
FIG. 9 is sectional view of an actuator having an anti-backlash mechanism in accordance with other aspects of the disclosure.
Figure 10A:
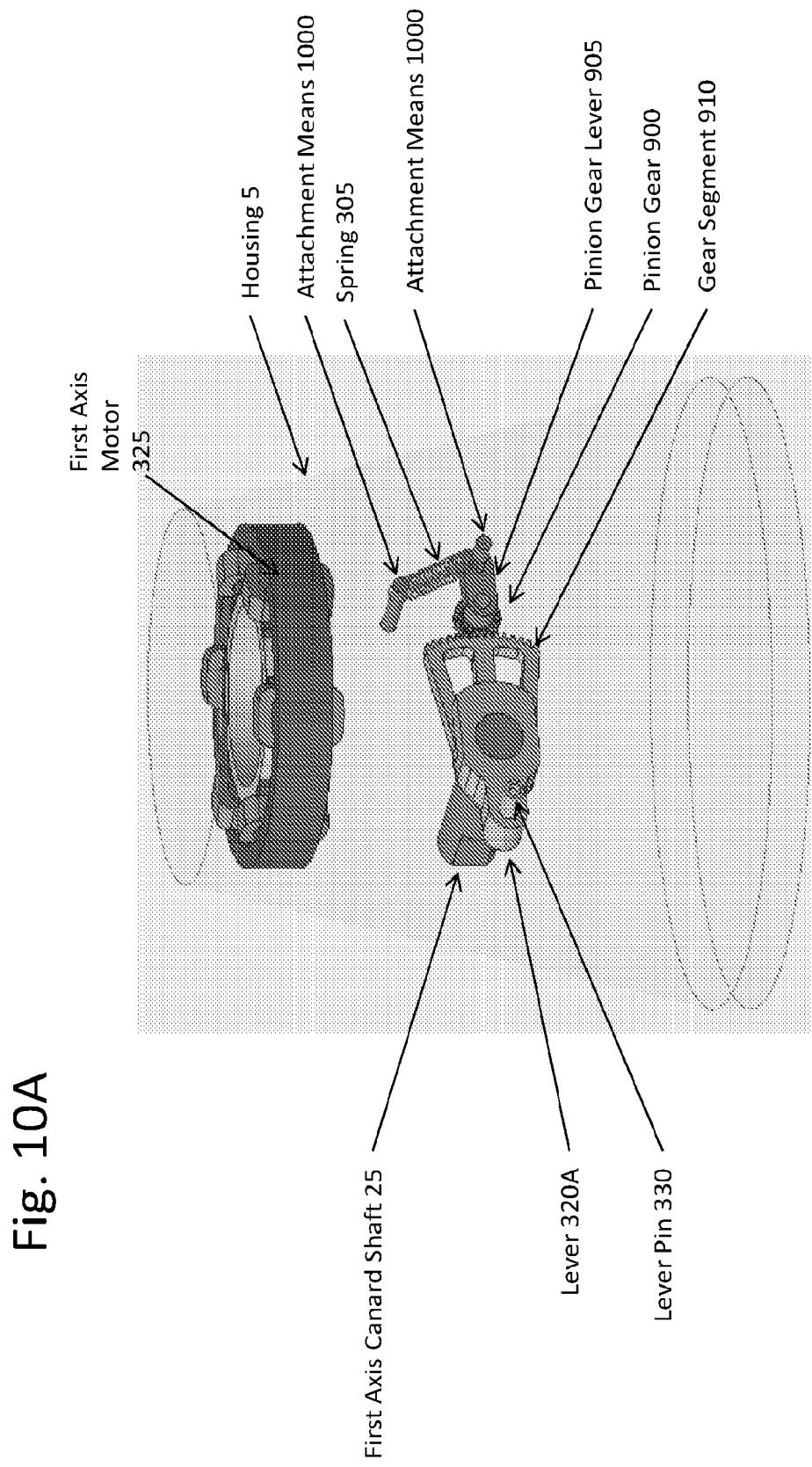
FIG. 10A is a view of an actuator having the anti-backlash mechanism depicted in FIG. 9.
Figure 10B:
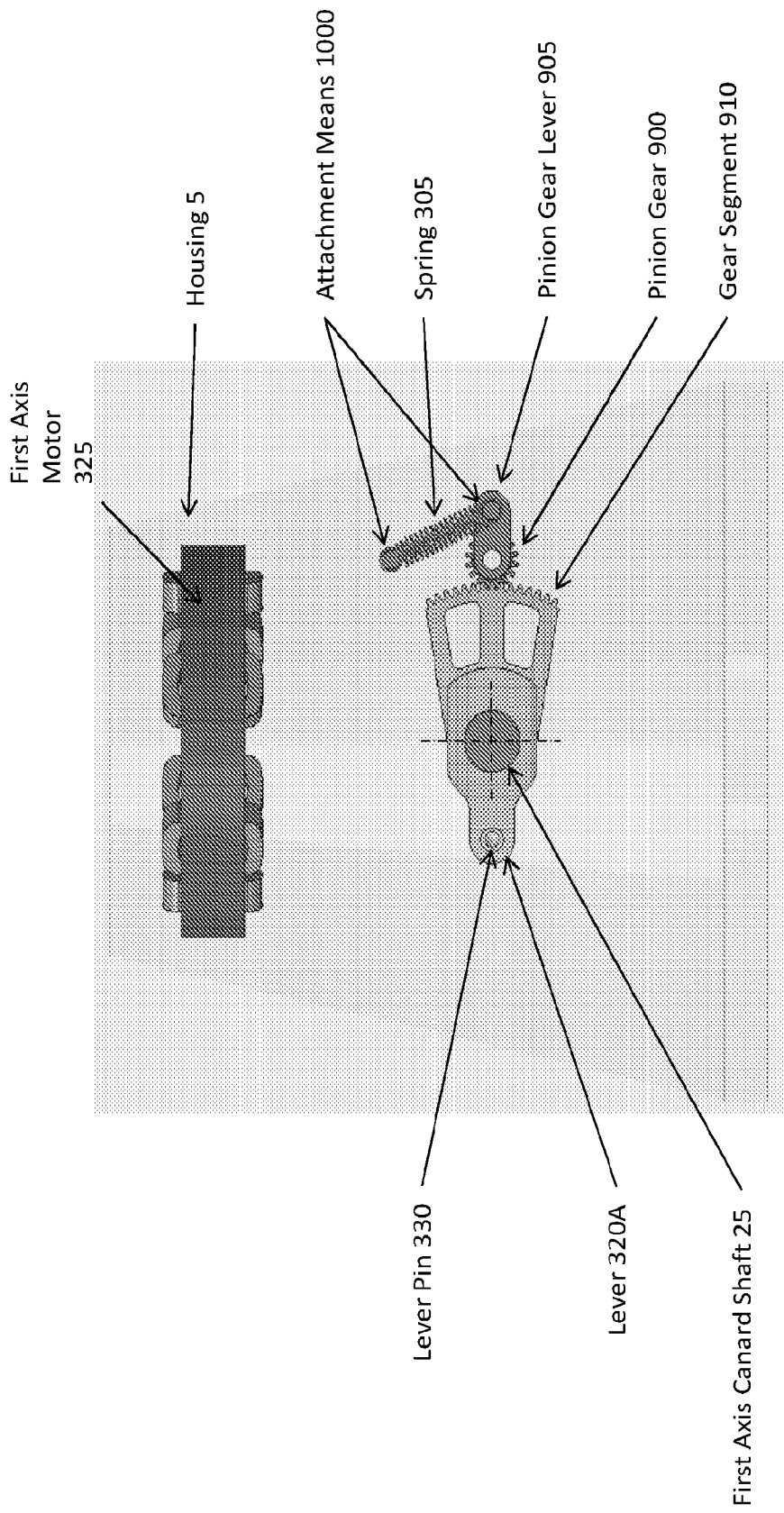
FIG. 10B is another view of the actuator having the anti-backlash mechanism as depicted in FIG. 9.

FIGS. 9, 10A and 10B depict an anti-backlash mechanism in accordance with other aspects of the disclosure in an actuator 1A. In FIGS. 9, 10A and 10B, many of the components of the actuator 1A are not shown to highlight the anti-backlash mechanism. For example, in FIGS. 10A and 10B, the internal walls of the housing 5 have been removed and well as certain components of the drive, such as a drive screw 340 connected to the motor 325, cross pin(s) and connecting rod(s), etc. . . . The housing 5 is also lightened to better show the views of the anti-backlash mechanism in FIGS. 10A and 10B. In this aspect, the extended section of the lever 320A is a gear segment 910. In an aspect of the disclosure, the gear segment 910 may be a quarter gear.

The gear segment 910 may be attached to the lever 320A. In other aspects of the disclosure, the gear segment 910 is integral to the lever 320A. For example, the gear segment 910 and lever 320A may be fabrication via 3-dimensional printing techniques. However, other fabrication techniques may be used.

As depicted, the gear segment 910 is symmetric with respect to a side of the lever 320A, however, in other aspects, the gear segment 910 may be offset and positioned on multiple sides of the lever 320A.

Similar to above, the spring 305 may be anchored to the housing 5. For example, one end of the spring 305 may be anchored to the housing 5 above the lever 320A. As shown in FIGS. 13A-13E, the spring may also be anchored in alignment with the lever 320A. The position of the anchor may be selected based on the application and the desired controllable torque and target range of motion. A pinion gear lever 905 is rotatably mounted to the other end of the spring 305 via an attachment means 1000. In an aspect, the attachment means 1000 may be a pin, a screw, a rod or an axle.

A pinion gear 900 is mounted to the free end of the pinion gear lever 905. The pinion gear 900 may be attached to the lever via a screw. The pinion gear 900 may rotate when in contact with the gear segment 910. The gear 900 meshes with the gear segment 910. The rotation may cause the pinion gear lever 905 to rotate relative to the spring 305. This rotation changes the direction of the force and thus causes a controllable torque on the lever 320A.

In other aspects of the disclosure, the gear ratio (tooth counts) may be selected based on the application and desired controllable torque and range of motion. For example, for 90 degrees of motion of the pinion gear 900, which the ratio is 1:6 produces 15 degrees of motion of the lever 320A. The size of the gear segment 910 may be determined from the target range of motion and the torque.

Figure 11:
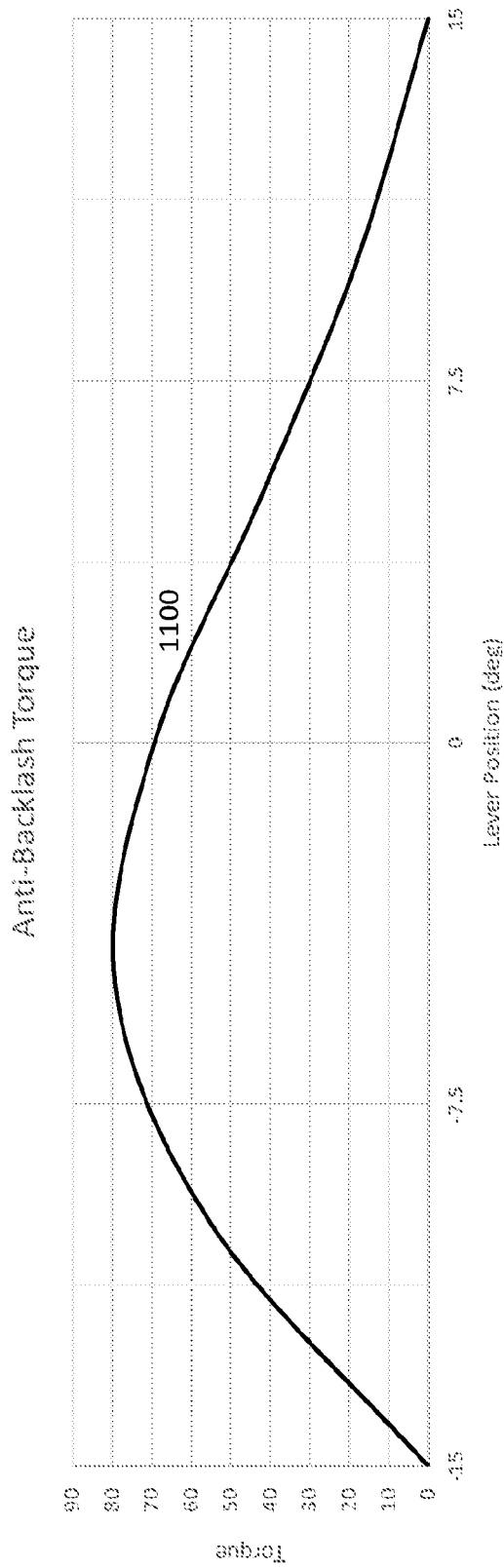
FIG. 11 is a graph showing an example of a torque and angle curve for the example of the anti-backlash mechanism as shown in FIGS. 9, 10A and 10B.
Figure 12:
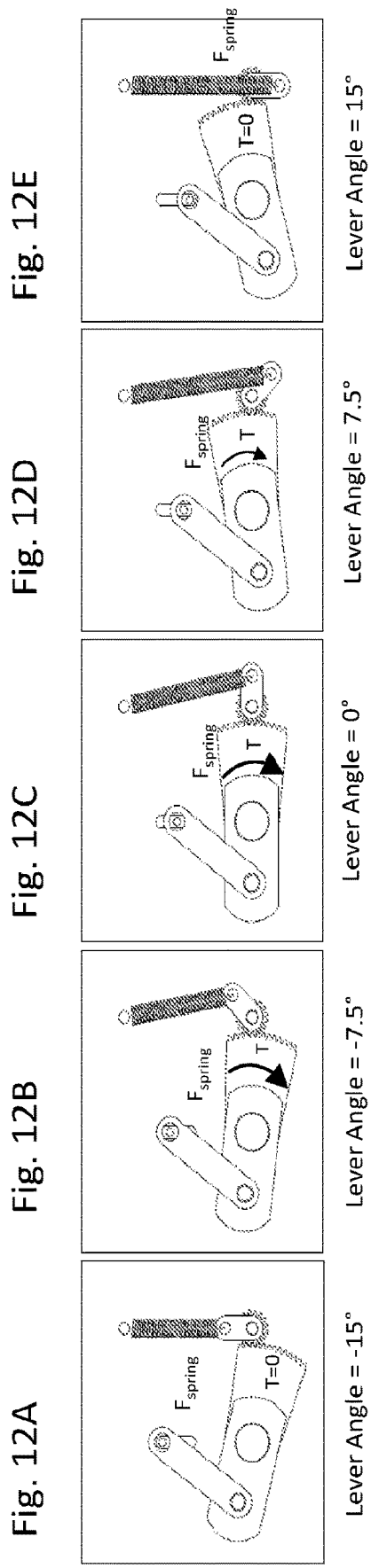
FIGS. 12A-12E show the direction of the spring force and torque for difference angles of the lever for the anti-backlash mechanism as shown in FIGS. 9, 10A and 10B.

In some aspects of the disclosure, the anchor position of the spring, the size and shape of the gear segment 910, the relative position of the pinion gear 900/pinion gear lever 905 is set such that zero torque is applied at the end of the target range of motion to control the torque. For example, where the spring is anchored above the lever, the combination of feature is design such that there is only a vertical direction of the force when outside the target range of motion. For example, as shown in FIGS. 12A and 12E, when the lever 320A is at a lever angle of +−15°, the spring force is up (no horizontal component) and thus the torque applied to the lever 320A via the gear segment 910 is 0 (T=0). This is also shown in the curve 1100 in FIG. 11. In these positions, the pinion gear lever 905 is rotated parallel to the spring 305, e.g., aligned vertically.

When the lever 320A rotates to an angle between the end points of the target range, in this configuration, there is a component of the spring force that is radial to the pinion axis of rotation. The direction of the spring force is shown in FIGS. 12A-12E with an arrow. This component of the spring force produces a clockwise torque as shown in FIGS. 12B-12D. The pinion gear lever 905 is not parallel to the spring 305.

Figure 13:
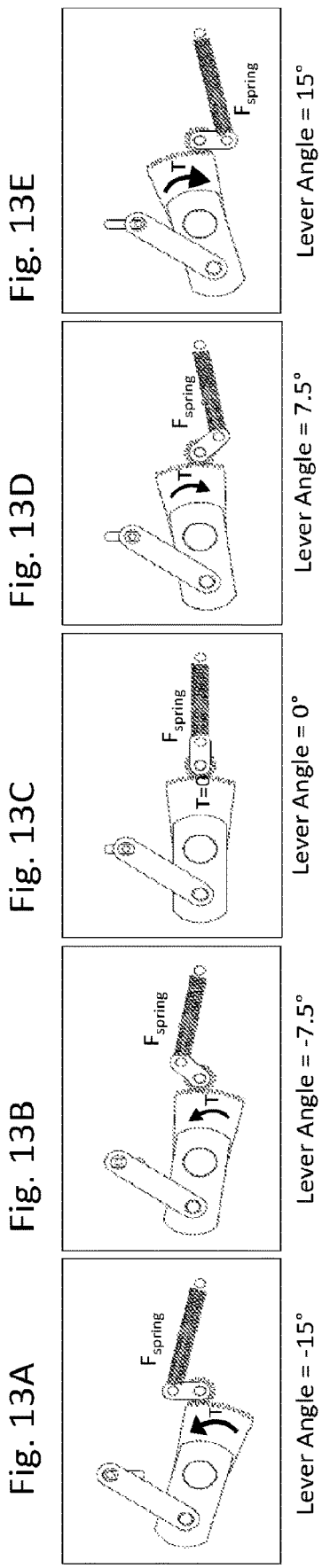
FIGS. 13A-13E show the direction of the spring force and torque for difference angles of the lever for the anti-backlash mechanism in accordance with other aspects of the disclosure; where the anchor point for the spring is at a different location than in FIGS. 9, 10A and 10B.

In other aspects of the disclosure, the anchor position of the spring, the size and shape of the gear segment 910, the relative position of the pinion gear 900/pinion gear lever 905 is set such that zero torque is applied when the component, e.g., lever 320A, is at zero degree angle. For example, the anchor point of the spring may be aligned with the axis of rotation of the lever 320A as shown in FIG. 13A-13E. As shown in FIG. 13C, when the lever 320 has an angle of zero degrees, there is no vertical component of the spring force and no torque is provided. The direction of the spring force is shown in FIGS. 13A-13E with an arrow. The pinion gear lever 905 is rotated parallel to the spring 305, e.g., aligned horizontally.

In this configuration, the direction of the torque is different for positive and negative lever angles. When the lever angle is negative, such as shown in FIGS. 13A and 13B, the torque produced is counterclockwise. When the lever angle is positive, such as shown in FIGS. 13D and 13E, the torque produced is clockwise.

Figure 14:
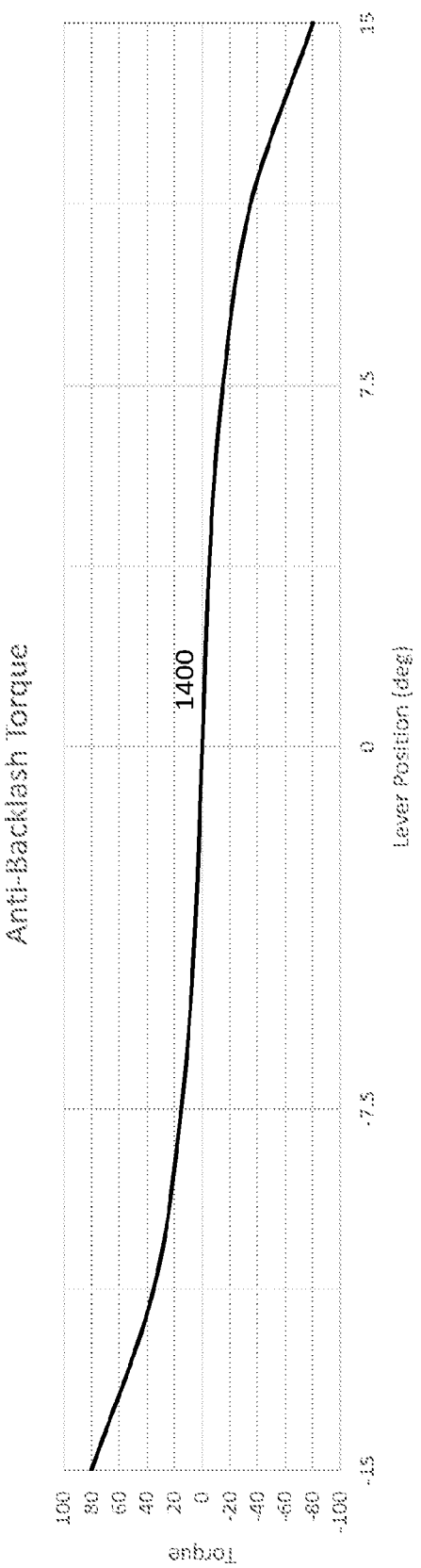
FIG. 14 is a graph showing an example of a torque and angle curve for an example of the anti-backlash mechanism in accordance with aspects of the disclosure.

FIG. 14 shows an example of a torque verses lever angle curve 1400 for the anti-backlash mechanism where the anchor point is horizontally aligned with the axis of rotation (as depicted in FIGS. 13A-13E). As shown, when the lever position is at a negative angle, the torque is positive whereas, when the lever position is at a positive angle, the torque is negative.

In other aspects of the disclosure, the extended section such as the cam surface 300 or the gear segment 910 may be located on the canard shaft 25 or other components of the transmission path. For example, the connecting rod 405 (which connects the drive screw 340 to the lever) may be formed with a cam surface 300 or a gear segment 910. In accordance with this aspect of the disclosure, the load, e.g., the spring 305 and cam follower 310 or spring 305 and pinion gear 900 and pinion gear lever 905, may be disposed in proximity of the connecting rod.

In an aspect of the disclosure, the actuator may be installed in a precision-guided munition 1500 as shown in FIG. 15, as part of a guidance system. The guidance system may also include an on-board processor that controls the actuator. As shown, the actuator is adjacent to the tip or cone; however, the actuator may be located in a different position of the precision-guided munition. The munition 1500 may also include a propulsion system 1542 including a fuel tank. In other aspects of the disclosure, the propulsion system 1542 may include an energy storage device such as a battery. In other aspects of the disclosure, instead of a fuel tank, the propulsion system 1542 may include an energy storage device.

An described above, the actuator comprises an anti-backlash mechanism which provides a controllable torque over a range of angular motion of at least one of the plurality of components or an output shaft. This controllable torque may be applied during launch, through flight and descent which allows for a more accurate guidance of the munition's trajectory to the target.

Figure 17A:
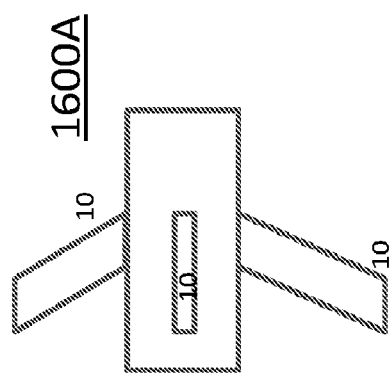
FIG. 17A shows another example of a kit for a precision-guided munition in accordance with aspects of the disclosure and FIG. 17B shows another example of a precision-guided munition having the kit attached in accordance with aspects of the disclosure.

In other aspects, the actuator may be a kit 1600/1600A that may be added to a precision-guided munition 1500A/1500B. Examples of kits 1600/1600A are shown in FIG. 16A and FIG. 17A. The kit 1600/1600A may include the actuator as described herein with a housing having an attachment mechanism. The attachment mechanism may comprise threading. In other aspects, the housing of the actuator may have an opening for screws or bolts to attach the actuator to the precision-guided munition 1500A/1500B. In other aspects, the kit 1600/1600A may be welded to the munition 1500A/1500B.

Figure 17B:
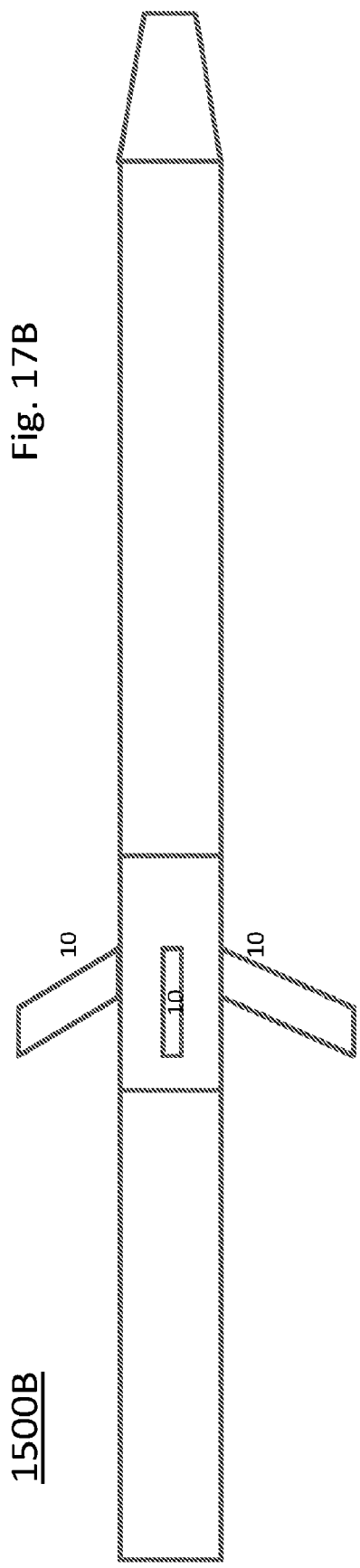

The kit 1600/1600A may be attached to the precision-guided munition 1500A/1500B at various locations. For example, as shown in FIG. 16B, the kit 1600 may be attached near the cone (tip). The payload may be included in the cone. However, as shown in FIG. 17B, the kit 1600A may be attached near the middle of the munition 1500B. Similar to above, the kit 1600/1600A allows for a more accurate guidance of the munition's trajectory to the target by removing the backlash during launch, flight and descent.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. An apparatus comprising:
   a drive source;
   a transmission path connected to the drive source, the transmission path comprising a plurality of components;
   an output shaft connected to the transmission path, at least one of the plurality of components or the output shaft having an extended section;
   a load, one end of the load being anchored and another end of the load being in contact with the extended section to provide a controllable torque over a range of angular motion of the at least one of the plurality of components or the output shaft;
   wherein the extended section comprising a cam, and the load comprises: a cam follower and a spring, the spring having a first end and a second end, the first end is anchored, the second end of the spring being connected to the cam follower or a linkage included in the load, where the cam follower contacts the cam surface and exerts a force on the cam surface, causing the controllable torque when the at least one of the plurality of components or the output shaft rotates and the cam follower contacts different portions of the cam surface; and
   wherein the plurality of components comprise:
   a drive screw having a first end and a second end, the first end connected to the drive source;
   a component having a first end and a second end, the first end of the component is connected to the second end of the drive screw via a connecting pin through a hole in the drive screw and a hole in the component; and
   a lever connected to the second end of the component via a connecting pin through a hole in the component and a hole in the lever, the output shaft extending through another hole in the lever, the lever configured to rotate in concert with the output shaft.

2. The apparatus of claim 1, wherein the lever has the cam surface.

3. The apparatus of claim 2, wherein the controllable torque is based on a position of the one end of the load anchored to a housing or a connecting plate, a shape and position of the cam surface and a point of contact at zero degrees of rotation.

4. The apparatus of claim 1, wherein the range of angular motion is −15° to 15°.

5. The apparatus of claim 1, wherein the linkage is between the spring and the cam follower.

6. The apparatus of claim 1, wherein the extended section comprises a gear segment and the load comprises:
   a spring having a first end and a second end, the first end is anchored,
   a pinion gear lever connected to the second end of the spring; and
   a pinion gear connected to the pinion gear lever, where the pinion gear meshes with the gear segment and exerts a force on the gear segment, causing the controllable torque as the at least one of the plurality of components or the output shaft rotates and the pinion gear contacts different portions of the gear segment.

7. The apparatus of claim 6, wherein the plurality of components comprise:
   a drive screw having a first end and a second end, the first end connected to the drive source;
   a component having a first end and a second end, the first end of the component is connected to the second end of the drive screw via a connecting pin through a hole in the drive screw and a hole in the component; and
   a lever connected to the second end of the component via a connecting pin through a hole in the component and a hole in the lever, the output shaft extending through another hole in the lever, the lever configured to rotate in concert with the output shaft.

8. The apparatus of claim 7, wherein the lever has the gear segment.

9. The apparatus of claim 8, wherein the controllable torque is based on a position of the one end of the load anchored to the housing, a position of the gear segment, size of the gear segment, gear ratio of teeth on the gear segment and pinion gear and a point of contact at zero degrees of rotation.

10. The apparatus of claim 9, wherein the extended section is integrally formed with the at least one of the plurality of components or the output shaft.

11. The apparatus of claim 9, wherein the gear ratio is 1:6.

12. The apparatus of claim 11, wherein the gear segment is a quarter of a gear.

13. The apparatus of claim 1, wherein the linkage is between the housing or a plate and the cam follower, and the spring is connected to the linkage and the cam follower is connected to a free end of the linkage.

14. The apparatus of claim 13, wherein the linkage and spring is orthogonally mounted relative to each other.

15. An apparatus comprising:
   an attachment mechanism for attaching to a precision-guided munition;
   a drive source;
   a transmission path connected to the drive source, the transmission path comprising a plurality of components;
   an output shaft connected to the transmission path, at least one of the plurality of components or the output shaft having an extended section;

a load, one end of the load being anchored and another end of the load being in contact with the extended section to provide a controllable torque over a range of angular motion of the at least one of the plurality of components or the output shaft;
wherein the extended section comprising a cam, and the load comprises: a cam follower and a spring, the spring having a first end and a second end, the first end is anchored, the second end of the spring being connected to the cam follower or a linkage included in the load, where the cam follower contacts the cam surface and exerts a force on the cam surface, causing the controllable torque when the at least one of the plurality of components or the output shaft rotates and the cam follower contacts different portions of the cam surface; and
wherein the plurality of components comprise:
a drive screw having a first end and a second end, the first end connected to the drive source;
a component having a first end and a second end, the first end of the component is connected to the second end of the drive screw via a connecting pin through a hole in the drive screw and a hole in the component; and
a lever connected to the second end of the component via a connecting pin through a hole in the component and a hole in the lever, the output shaft extending through another hole in the lever, the lever configured to rotate in concert with the output shaft.

16. A precision-guided munition comprising:
a propulsion system;
an actuator comprising:
a drive source;
a transmission path connected to the drive source, the transmission path comprising a plurality of components;
an output shaft connected to the transmission path, at least one of the plurality of components or the output shaft having an extended section; and
a load, one end of the load being anchored and another end of the load being in contact with the extended section to provide a controllable torque over a range of angular motion of the at least one of the plurality of components or the output shaft;
a payload;
wherein the extended section comprising a cam, and the load comprises: a cam follower and a spring, the spring having a first end and a second end, the first end is anchored, the second end of the spring being connected to the cam follower or a linkage included in the load, where the cam follower contacts the cam surface and exerts a force on the cam surface, causing the controllable torque when the at least one of the plurality of components or the output shaft rotates and the cam follower contacts different portions of the cam surface; and
wherein the plurality of components comprise:
a drive screw having a first end and a second end, the first end connected to the drive source;
a component having a first end and a second end, the first end of the component is connected to the second end of the drive screw via a connecting pin through a hole in the drive screw and a hole in the component; and
a lever connected to the second end of the component via a connecting pin through a hole in the component and a hole in the lever, the output shaft extending through another hole in the lever, the lever configured to rotate in concert with the output shaft.

\* \* \* \* \*